(12) United States Patent
Sakurai

(10) Patent No.: US 9,998,668 B2
(45) Date of Patent: Jun. 12, 2018

(54) IMAGING APPARATUS

(71) Applicant: Panasonic Intellectual Property Management Co., Ltd., Osaka (JP)

(72) Inventor: Mikio Sakurai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 14/547,174

(22) Filed: Nov. 19, 2014

(65) Prior Publication Data

US 2015/0256756 A1 Sep. 10, 2015

(30) Foreign Application Priority Data

Mar. 10, 2014 (JP) .................................. 2014-045891
Oct. 20, 2014 (JP) .................................. 2014-213447

(51) Int. Cl.
   *H04N 5/232* (2006.01)
(52) U.S. Cl.
   CPC ....... *H04N 5/23287* (2013.01); *H04N 5/2329* (2013.01); *H04N 5/23258* (2013.01)
(58) Field of Classification Search
   None
   See application file for complete search history.

(56) References Cited

U.S. PATENT DOCUMENTS

| | | | |
|---|---|---|---|
| 7,688,381 B2* | 3/2010 | VanBree | H04N 5/222 348/207.11 |
| 2006/0092285 A1* | 5/2006 | Shin | H04N 5/2253 348/208.7 |
| 2006/0251410 A1* | 11/2006 | Trutna, Jr. | G03B 5/02 396/55 |

(Continued)

FOREIGN PATENT DOCUMENTS

| | | |
|---|---|---|
| JP | 2008-257209 | 10/2008 |
| JP | 2010-041510 | 2/2010 |

(Continued)

*Primary Examiner* — Roberto Velez
*Assistant Examiner* — Yih-Sien Kao
(74) *Attorney, Agent, or Firm* — Wenderoth, Lind & Ponack, L.L.P.

(57) ABSTRACT

Provided is an imaging apparatus which corrects uneven exposure caused when a sensor-shift image stabilization and an electronic front curtain reset are used concurrently. The imaging apparatus includes: a camera shake detector configured to detect a camera shake; an imaging device configured to capture e a subject image; an image stabilizer configured to move the imaging device in a plane perpendicular to an optical axis; an electronic front curtain configured to reset electric charges accumulated in the imaging device; a mechanical shutter configured to switch between blocking and passing of a subject image to be collected onto the imaging device; and an image stabilization controller configured to produce an image stabilization signal from the camera shake detected by the camera shake detector and configured to control the image stabilizer. The image stabi- (Continued)

lization controller controls the imaging device to move to a specified position and then controls the electronic front curtain to operate in response to the shooting instruction.

6 Claims, 14 Drawing Sheets

(56) References Cited

U.S. PATENT DOCUMENTS

| 2008/0125649 | A1* | 5/2008 | Meyer | A61B 6/0457 |
| | | | | 600/426 |
| 2008/0298790 | A1 | 12/2008 | Uenaka et al. | |
| 2011/0102655 | A1* | 5/2011 | Fujiyama | G02B 27/646 |
| | | | | 348/302 |
| 2012/0147201 | A1* | 6/2012 | Asukabe | H04N 5/23258 |
| | | | | 348/208.1 |

FOREIGN PATENT DOCUMENTS

| JP | 2011-166445 | 8/2011 |
| JP | 2012-129588 | 7/2012 |

* cited by examiner

IMAGING APPARATUS

BACKGROUND OF THE INVENTION

1. Field of the Invention

The present disclosure relates to an imaging apparatus equipped with a sensor-shift image stabilization system and an electronic front curtain reset.

2. Description of the Related Art

In recent years, digital single-lens reflex cameras or mirrorless system cameras use an electronic front curtain-mechanical rear curtain shutter (hereinafter referred to as "electronic front curtain shutter"), which uses an electronically-controlled front curtain on an imaging device (hereinafter referred to as "electronic front curtain reset") and a rear curtain of a mechanical shutter (hereinafter referred to as "mechanical rear curtain shutter") in combination (see, for example, Unexamined Japanese Patent Publication No. 2010-41510).

Also, such a configuration using an electronic front curtain shutter is known that performs a reset-scanning line by line to reset the quantity of charges accumulated in each pixel of the imaging device to zero by the electronic front curtain reset before running the mechanical rear curtain (see, for example, Unexamined Japanese Patent Publication No. 2012-129588). In this manner, an image capturing operation is realized by operating the mechanical rear curtain after a lapse of a certain time to shield the imaging device from light, and performing a scan for reading out signals after a lapse of a specified time line by line.

The electronic front curtain shutter makes it possible to improve camera performances by size-reduction of the imaging apparatus, reduction of the release time lag, reduction of operation sound, and reduction of the release shock.

Also, many digital single-lens reflex cameras or many mirrorless system cameras have an image stabilization function, which includes an image stabilization system built in the camera body (hereinafter referred to as "sensor-shift image stabilization"), and an image stabilization system built in the lens unit (hereinafter referred to as "lens-shift image stabilization").

The sensor-shift image stabilization can correct a camera shake caused on the camera body by shifting the imaging device. Also, the sensor-shift image stabilization can correct a rotational camera shake caused on the camera body by rotating the imaging device.

CITATION LIST

Patent Literatures

PTL 1: Unexamined Japanese Patent Publication No. 2010-41510

PTL 2: Unexamined Japanese Patent Publication No. 2012-129588

SUMMARY OF THE INVENTION

When the shutter speed of a camera is set to a high speed shutter, shutter control must be performed by narrowing the slit width between the front curtain and the rear curtain, so that a highly precise shutter control is required. For example, to realize a shutter speed of 1/4000 or shorter, such a high precision is required that a position error between the front curtain and the rear curtain is in the order of 0.1 mm. If this precision is not satisfied, such an adverse effect will be caused that the aimed shutter speed cannot be obtained or that uniform exposure on the image cannot be obtained.

In the case of using the electronic front curtain shutter, severer control is necessary than the case of using the mechanical front curtain-mechanical rear curtain shutter. Specifically, the timing and locus of the electronic front curtain reset must be controlled by accurately understanding the position and locus of the mechanical rear curtain.

On the other hand, in the case of using the sensor-shift image stabilization and the electronic front curtain shutter concurrently, position of the imaging device is changed due to correction of a camera shake caused, so that the timing of the electronic front curtain reset relative to the mechanical rear curtain may occasionally be shifted. As a result, an intended shutter speed cannot be obtained, so that uneven exposure is caused.

To compensate for this timing shift, Unexamined Japanese Patent Publication No. 2012-129588 discloses a configuration that corrects the reset timing of the electronic front curtain reset according to the position of the imaging device.

However, if correction in a rotational direction is possible by the sensor-shift image stabilization, the electronic front curtain reset cannot be controlled by merely correcting the reset timing in the vertical direction.

Also, since the incident light through the lens reaches the imaging device at a certain incident angle, starting the electronic front curtain reset when the imaging device is in a position shifted from an initial position may be a cause of shading or vignetting in the upper and lower parts of an image.

The present disclosure provides an imaging apparatus that can compensate for uneven exposure which may be caused when the sensor-shift image stabilization and the electronic front curtain reset are used concurrently.

An imaging apparatus according to the present disclosure includes: a camera shake detector configured to detect a camera shake; an imaging device configured to capture a subject image; an image stabilizer configured to move the imaging device in a plane perpendicular to an optical axis; an electronic front curtain configured to reset electric charges accumulated in the imaging device; a mechanical shutter configured to switch between blocking and passing of a subject image to be collected onto the imaging device; and an image stabilization controller configured to produce an image stabilization signal from the camera shake detected by the camera shake detector and configured to control the image stabilizer. The image stabilization controller controls the imaging device to move to a specified position and then controlling the electronic front curtain to operate in response to the shooting instruction.

The imaging apparatus according to the present disclosure makes it possible to prevent the uneven exposure from being caused when the sensor-shift image stabilization and the electronic front curtain reset are used concurrently.

DETAILED DESCRIPTION OF THE PREFERRED EMBODIMENT

Hereinafter, an exemplary embodiment will be described with reference to the accompanying drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

Also, it should be noted that the following description and the accompanying drawings are provided to allow any person skilled in the art to fully understand the present disclosure, and that it is not intended to limit the subject matter described in the claims by the following description.

First Exemplary Embodiment

Hereinafter, a first exemplary embodiment will be described with reference to FIG. 1 to FIG. 15.

1. Configuration 1-1. Configuration of Digital Camera

Figure 1:
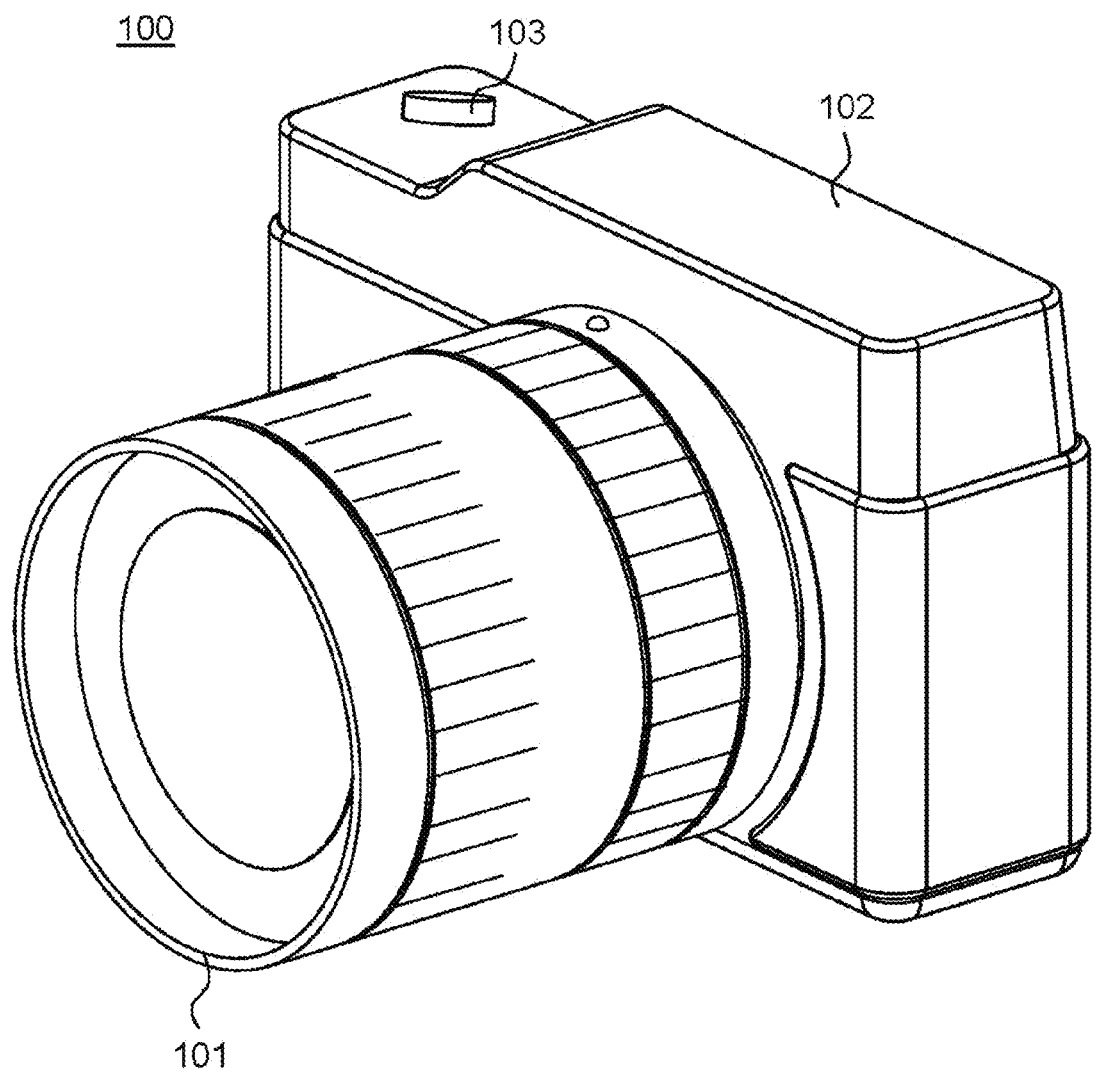
FIG. 1 is an external view of a digital camera in accordance with a first exemplary embodiment.

FIG. 1 is an external view of digital camera 100 in accordance with the first exemplary embodiment.

Digital camera 100 has interchangeable lens 101, and camera body 102 to which interchangeable lens 101 can be attached. Camera body 102 has release button 103. Camera body 102 is responsive to a user's operation of half-way pressing release button 103 to send to interchangeable lens 101 a control signal instructing an autofocus operation. Also, camera body 102 is responsive to a user's operation of fully pressing release button 103 to perform an operation of shooting a subject image formed through interchangeable lens 101.

Figure 2:
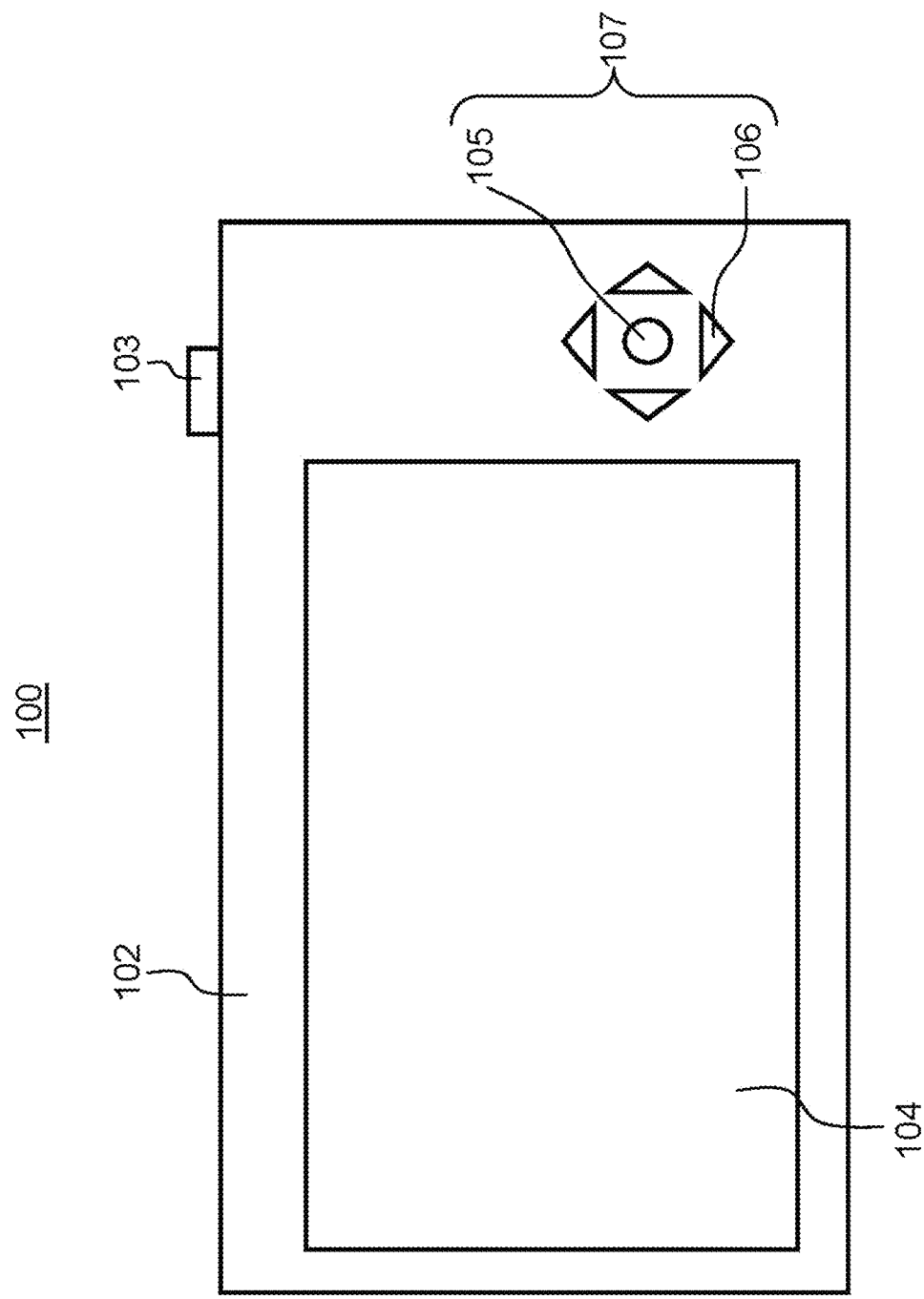
FIG. 2 is a back view of the digital camera in accordance with the first exemplary embodiment.

FIG. 2 is a back view of digital camera 100 in accordance with the first exemplary embodiment. Camera body 102 has, on a back side of digital camera 100, touch panel 104, and camera operation unit 107 including center button 105 and directional pad key 106. Camera body 102 accepts a user operation from touch panel 104 or camera operation unit 107, and performs control corresponding to the operation.

Figure 3:
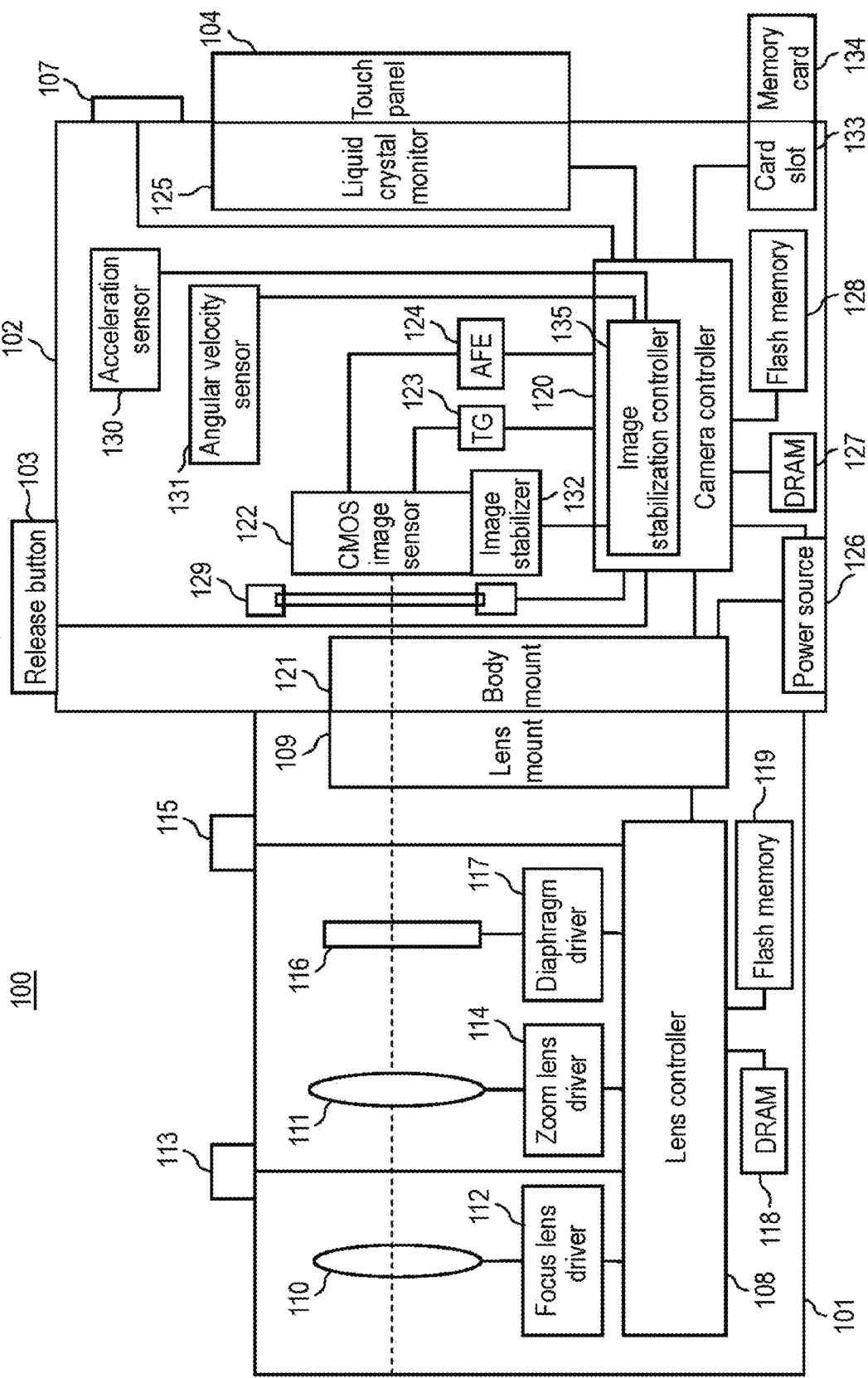
FIG. 3 is a configuration diagram of the digital camera in accordance with the first exemplary embodiment.

FIG. 3 is a configuration diagram of digital camera 100 in accordance with the first exemplary embodiment.

Interchangeable lens 101 has: an optical system including lens controller 108, lens mount 109, focus lens 110 and zoom lens 111; focus lens driver 112; focus ring 113; zoom lens driver 114; zoom ring 115; diaphragm 116; diaphragm driver 117; DRAM 118; and flash memory 119.

Camera body 102 has camera controller 120, body mount 121, CMOS image sensor 122, timing generator (TG) 123, analog front end (AFE) 124, liquid crystal monitor 125, touch panel 104, release button 103, camera operation unit 107, power source 126, DRAM 127, flash memory 128, mechanical shutter 129, acceleration sensor 130, angular velocity sensor 131, image stabilizer 132, card slot 133, and memory card 134. Camera controller 120 has image stabilization controller 135.

In the present exemplary embodiment, CMOS image sensor 122 is used as an imaging device. Also, angular velocity sensor 131 and acceleration sensor 130 respectively detect angular velocity and acceleration of a camera shake caused on camera body 102.

1-2. Configuration of Interchangeable Lens

First, a configuration of interchangeable lens 101 will be described.

The lens system has a configuration including focus lens 110 and zoom lens 111 to collect light from a subject.

Zoom lens 111 is driven by zoom lens driver 114. Zoom lens driver 114 drives zoom lens 111 according to a user's operation of zoom ring 115.

Focus lens 110 is driven by focus lens driver 112. Focus lens driver 112 drives focus lens 110 according to either a user's operation of focus ring 113 or a control signal from camera controller 120 of camera body 102.

Diaphragm 116 adjusts the quantity of light incident on CMOS image sensor 122 through the lens system. Diaphragm 116 is driven by diaphragm driver 117. Diaphragm driver 117 drives diaphragm 116 according to a control signal from camera controller 120 of camera body 102.

Lens controller 108 controls the entire interchangeable lens 101. Lens controller 108 may be realized by a microcomputer or may be realized by a hard-wired circuit. When interchangeable lens 101 is attached to camera body 102, lens controller 108 reads out lens data stored in flash memory 119, and sends the read-out lens data to camera controller 120.

DRAM 118 is used as a work memory for various controls by lens controller 108. Also, flash memory 119 has stored therein parameters and the like used for various controls by lens controller 108.

1-3. Configuration of Camera Body

Next, a configuration of camera body 102 will be described.

Camera controller 120 controls the entire digital camera 100 including CMOS image sensor 122 according to a user's instruction from release button 103 or camera operation unit 107. Camera controller 120 notifies TG 123 of a vertical synchronizing signal. In parallel with this notification, camera controller 120 generates an exposure synchronizing signal based on the vertical synchronizing signal. Camera controller 120 notifies lens controller 108 of the generated exposure synchronizing signal repeatedly in a periodical manner through body mount 121 and lens mount 109. Camera controller 120 is capable of writing information into or reading information from DRAM 127 and flash memory 128 as needed. Camera controller 120 may be realized by a hard-wired electronic circuit or may be realized by a microcomputer using programs.

DRAM 127 is used as a work memory for various controls by camera controller 120. Also, flash memory 128 has stored therein programs, parameters, and the like used for various controls by camera controller 120.

CMOS image sensor 122 captures a subject image incident through interchangeable lens 101 to produce image information. The produced image information is converted from analog form data to digital form data in AFE 124. The image information converted to digital data in AFE 124 is subjected to various image processing in camera controller 120. Examples of the various image processing include, but are not limited to, gamma correction, white balance correction, flaw correction, RGB to YUV conversion, electronic zoom, and JPEG compression.

Incidentally, CMOS image sensor 122 may be substituted by other imaging devices such as an NMOS image sensor and a CCD image sensor.

CMOS image sensor 122 operates at a timing controlled by TG 123. Operations of CMOS image sensor 122 include a still image capturing operation, a live-view image capturing operation, a data transmitting operation, an electronic front curtain reset operation, and an electronic front curtain operation. The live-view image is mainly a moving image, and the live-view image capturing operation is an operation to display the live-view image on liquid crystal monitor 125 for the user to determine a composition for shooting a still image.

Mechanical shutter 129 switches between blocking and passing of an optical signal incident through the lens system on CMOS image sensor 122. Mechanical shutter 129 is driven by a mechanical shutter driver which is not shown in the figure. The mechanical shutter driver is configured by mechanical components such as a motor and a spring, and is controlled by camera controller 120 to drive mechanical shutter 129. In other words, mechanical shutter 129 is opened or closed to temporally adjust the quantity of light incident on CMOS image sensor 122. A configuration of mechanical shutter 129 will be described later.

Body mount 121 is a connecting member for mechanically and electrically connecting interchangeable lens 101 and camera body 102 to each other in conjunction with lens mount 109 included in interchangeable lens 101. When interchangeable lens 101 and camera body 102 are mechanically and electrically connected to each other, communications become possible between lens controller 108 and camera controller 120. Body mount 121 notifies lens controller 108, through lens mount 109, of an exposure synchronizing signal and other control signals received from camera controller 120. Also, body mount 121 notifies camera controller 120 of signals received from lens controller 108 through lens mount 109.

Release button 103 receives a user's operation. Release button 103 can be operated in two stages—pressed half-way and pressed fully. When a user presses release button 103 half-way, camera controller 120 performs control to execute an autofocus operation. When the user presses release button 103 fully, camera controller 120 performs control to produce an image in response to the full-pressing operation timing, and to store the produced image into memory card 134.

Camera operation unit 107 is a collective term of operation members including center button 105 and directional pad key 106, and includes an MF/AF (Manual Focus/Auto Focus) changeover switch. When camera operation unit 107 receives an operation by the user, camera controller 120 performs control corresponding to the instruction indicated by the operation.

CMOS image sensor 122 is movable in a vertical direction, a horizontal direction and a rotational direction by image stabilizer 132. Details of image stabilizer 132 will be described later.

Acceleration sensor 130 is a sensor for detecting an acceleration of camera body 102. Acceleration sensor 130 detects a movement of camera body 102 in a specified period of time, and outputs a detected acceleration to image stabilization controller 135 in camera controller 120. Acceleration sensor 130 may preferably be a 3-axis acceleration sensor.

Angular velocity sensor 131 is a sensor for detecting an angular velocity of camera body 102. Angular velocity sensor 131 detects a movement of camera body 102 in a specified period of time, and outputs an angular velocity to image stabilization controller 135. Image stabilization controller 135 produces an image stabilization signal based on a signal obtained from angular velocity sensor 131. Based on this image stabilization signal, CMOS image sensor 122 is driven through image stabilizer 132 in a direction to cancel a camera shake caused on digital camera 100, so that a stabilized image can be captured.

The image stabilization signal produced by image stabilization controller 135 may be produced not only based on the signal from angular velocity sensor 131, but also based on both the signal from angular velocity sensor 131 and a signal from acceleration sensor 130, in the case of a shooting scene in which a translational shake may be caused.

2-1. Control by Camera Controller

Figure 4:
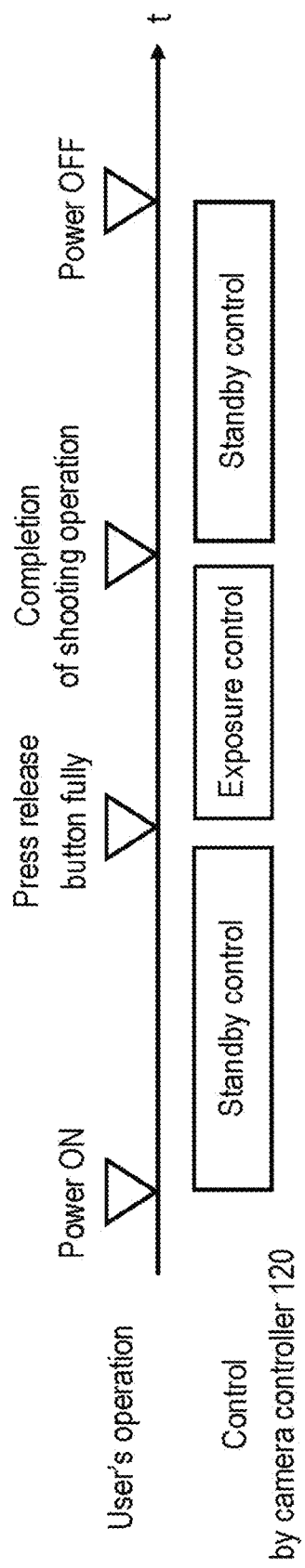
FIG. 4 is a timing chart showing an operation of a camera controller in accordance with the first exemplary embodiment.

FIG. 4 is a timing chart showing an operation of camera controller 120 in accordance with the first exemplary embodiment.

When power source 126 of camera body 102 is turned ON by a user, camera controller 120 performs standby control. In the standby control, camera controller 120 displays an image obtained by CMOS image sensor 122 on liquid crystal display 125 as a live-view image. Details of the standby control will be described later.

When the release button is pressed fully by the user, camera controller 120 performs exposure control. In the exposure control, camera controller 120 controls CMOS image sensor 122 and mechanical shutter 129 to realize an electronic front curtain shutter. While CMOS image sensor 122 is shielded by a curtain of mechanical shutter 129, camera controller 120 reads out image data of a still image. After completing the read-out of the image data, camera controller 120 moves the curtain of mechanical shutter 129 to an open position in which CMOS image sensor 122 is not shielded. Details of the exposure control will be described later.

After a shooting operation has been completed, camera controller 120 returns to the standby control. Then, when the power source of camera body 102 is turned OFF by the user, camera controller 120 stops supplying power to camera body 102.

2-2. Exposure Control

Figure 5:
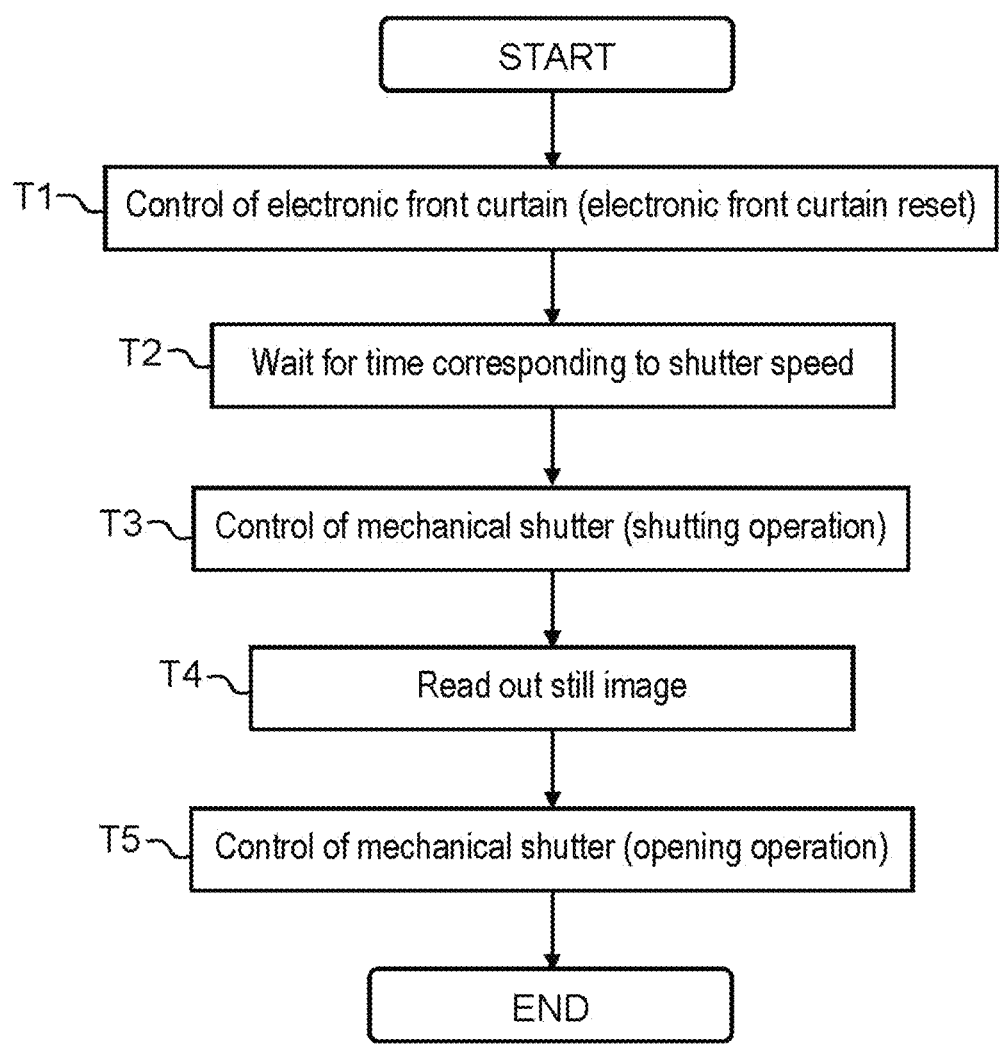
FIG. 5 is a flowchart showing exposure control of the camera controller in accordance with the first exemplary embodiment.

FIG. 5 is a flowchart showing exposure control of camera controller 120 in accordance with the first exemplary embodiment.

Camera controller 120 controls CMOS image sensor 122 to execute, as a front curtain, an electronic front curtain. Then, camera controller 120 controls mechanical shutter 129 to operate as a rear curtain. A shooting operation is executed by this control.

Here, in order to make a locus of the electronic front curtain as approximate as possible to a locus of mechanical shutter 129, which is the rear curtain, camera controller 120 performs an adjustment as described below.

A scanning pattern of the electronic front curtain is adjusted in scanning speed line by line. For example, during scanning from a start line to an end line, the scanning speed from a line to a next line is increased. This is because the shutting speed of mechanical shutter 129 gradually increases during time from the start to the end of the shutting operation.

Step T1: First, when the user presses the release button fully, camera controller 120 adjusts the scanning pattern of the electronic front curtain considering lens characteristics and shooting conditions, and performs control of the electronic curtain for CMOS image sensor 122, namely, the electronic front curtain reset.

Step T2: Next, after starting the electronic front curtain reset, camera controller 120 waits for time corresponding to the shutter speed.

Step T3: Camera controller 120 drives mechanical shutter 129 in a shutting direction.

Step T4: Then, camera controller 120 reads image data of a still image from CMOS image sensor 122.

Step T5: Then, camera controller 120 drives mechanical shutter 129 in an opening direction.

2-3. Configuration for Sensor-Shift Image Stabilization

Figure 6:
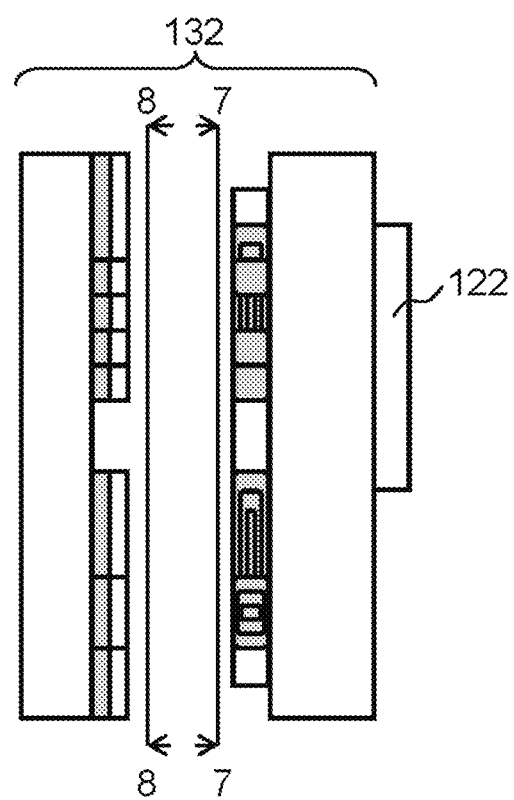
FIG. 6 is a schematic diagram showing an image stabilizer and a CMOS image sensor in accordance with the first exemplary embodiment.
Figure 7:
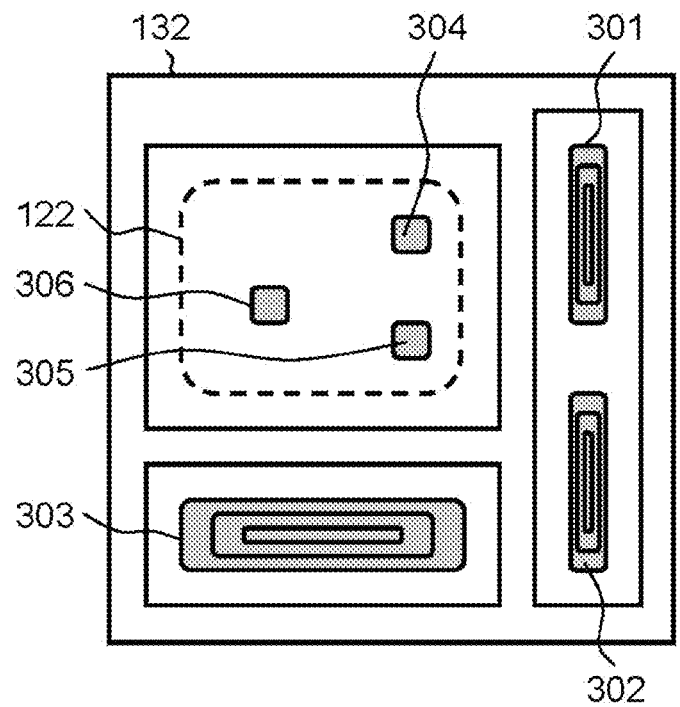
FIG. 7 is a view of the image stabilizer seen from a 7-7 direction shown in FIG. 6.
Figure 8:
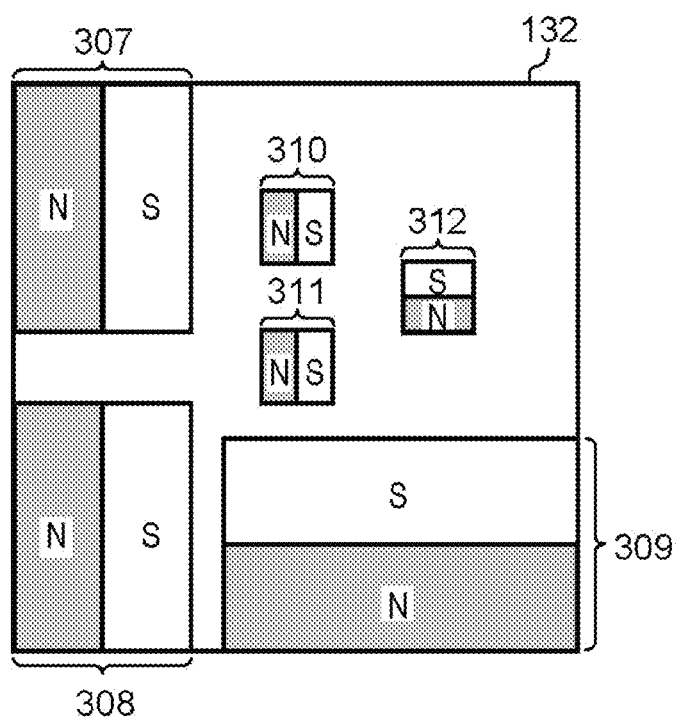
FIG. 8 is a view of the image stabilizer seen from an 8-8 direction shown in FIG. 6.

FIG. 6 is a schematic diagram showing image stabilizer 132 and CMOS image sensor 122 in accordance with the first exemplary embodiment. FIG. 7 is a view of image stabilizer 132 seen from a 7-7 direction shown in FIG. 6, and FIG. 8 is a view of image stabilizer 132 seen from an 8-8 direction shown in FIG. 6.

Image stabilizer 132 is in contact with CMOS image sensor 122, so that CMOS image sensor 122 moves in conjunction with a movement of image stabilizer 132. As shown in FIG. 7, image stabilizer 132 is provided with coils and sensors on a surface opposite to a surface contacting CMOS image sensor 122. Also, as shown in FIG. 8, magnets are disposed in positions facing the coils and sensors in FIG. 7.

As shown in FIG. 7, image stabilizer 132 includes X-direction coils 301 and 302 and Y-direction coil 303, and includes, on the surface opposite to the surface contacting CMOS image sensor 122, X-direction position sensors 304 and 305 and Y-direction position sensor 306. Also, as shown in FIG. 8, image stabilizer 132 includes X-direction drive magnets 307 and 308, Y-direction drive magnet 309, X-direction position detection magnets 310 and 311, and Y-direction position detection magnet 312.

X-direction coil 301 and X-direction drive magnet 307 are disposed to face each other so as to form a voice coil motor, X-direction coil 302 and X-direction drive magnet 308 are disposed to face each other so as to form a voice coil motor, and Y-direction coil 303 and Y-direction drive magnet 309 are disposed to face each other so as to form a voice coil motor. In this manner, two-channel voice coil motors are disposed on an X-axis, and one-channel voice coil motor is disposed on a Y-axis.

X-direction position detection magnets 310 and 311 and Y-direction position detection magnet 312 form a position sensor. In this manner, two-channel position sensors are disposed on the X-axis, and one-channel position sensor is disposed on the Y-axis.

The three voice coil motors and the three position sensors are provided for correcting camera shakes not only in the X-direction and the Y-direction, but also in a θ-direction. Accordingly, angular velocity sensor 131 is configured in a 3-axis structure so as to detect angular velocities in the X-direction, the Y-direction and the θ-direction.

Figure 9:
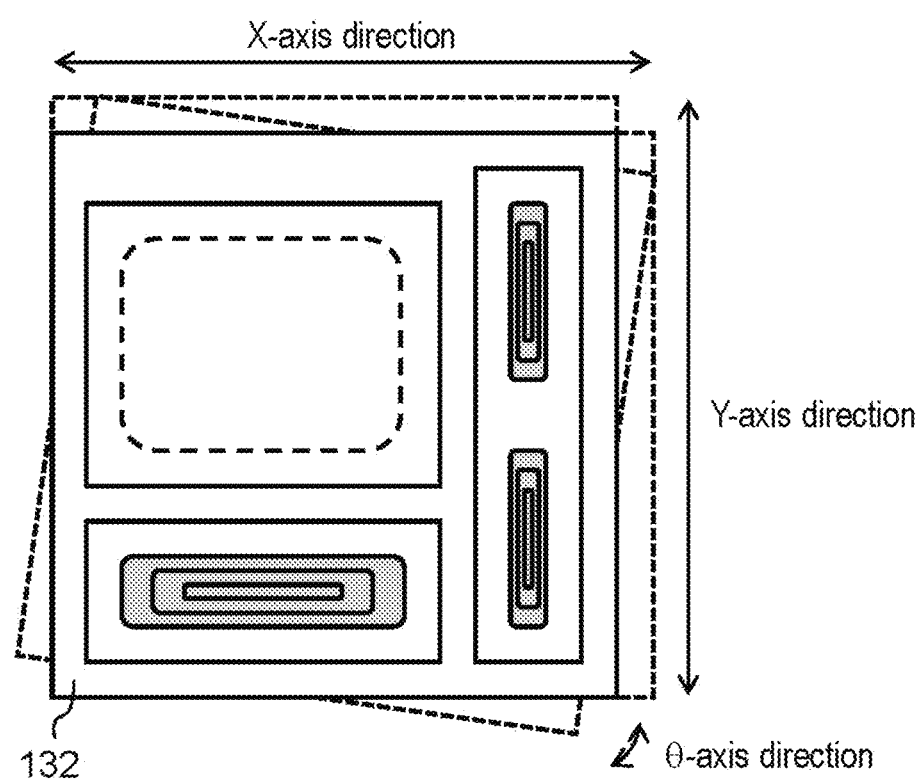
FIG. 9 is a diagram showing a movable range of the image stabilizer in accordance with the first exemplary embodiment.

FIG. 9 is a diagram showing a movable range of image stabilizer 132 in accordance with the first exemplary embodiment. As shown in FIG. 9, image stabilizer 132 is movable not only in the X-direction and the Y-direction, but also in the θ-direction.

Incidentally, in the present exemplary embodiment, two-channel voice coil motors and two-channel position sensors are disposed on the X-axis, and one-channel voice coil motor and one-channel position sensor are disposed on the Y-axis. However, this arrangement may be reversed such that one-channel voice coil motor and one-channel position sensor are disposed on the X-axis, and two-channel voice coil motors and two-channel position sensors are disposed on the Y-axis. The freedom of arrangement may not be limited to these.

Also, image stabilizer 132 has been explained as having a movable range extending in the X-direction, the Y-direction and the θ-direction. However, the movable range may be a two-axis range in the X-direction and the Y-direction, or may be a single axis range in one of the X-direction, the Y-direction and the θ-direction.

2-4. Problems in Using Sensor-Shift Image Stabilization and Electronic Front Curtain Shutter Concurrently Here, problems in the case of using the sensor-shift image stabilization and the electronic front curtain shutter concurrently will be described with reference to FIG. 10 and FIG. 11.

Figure 10:
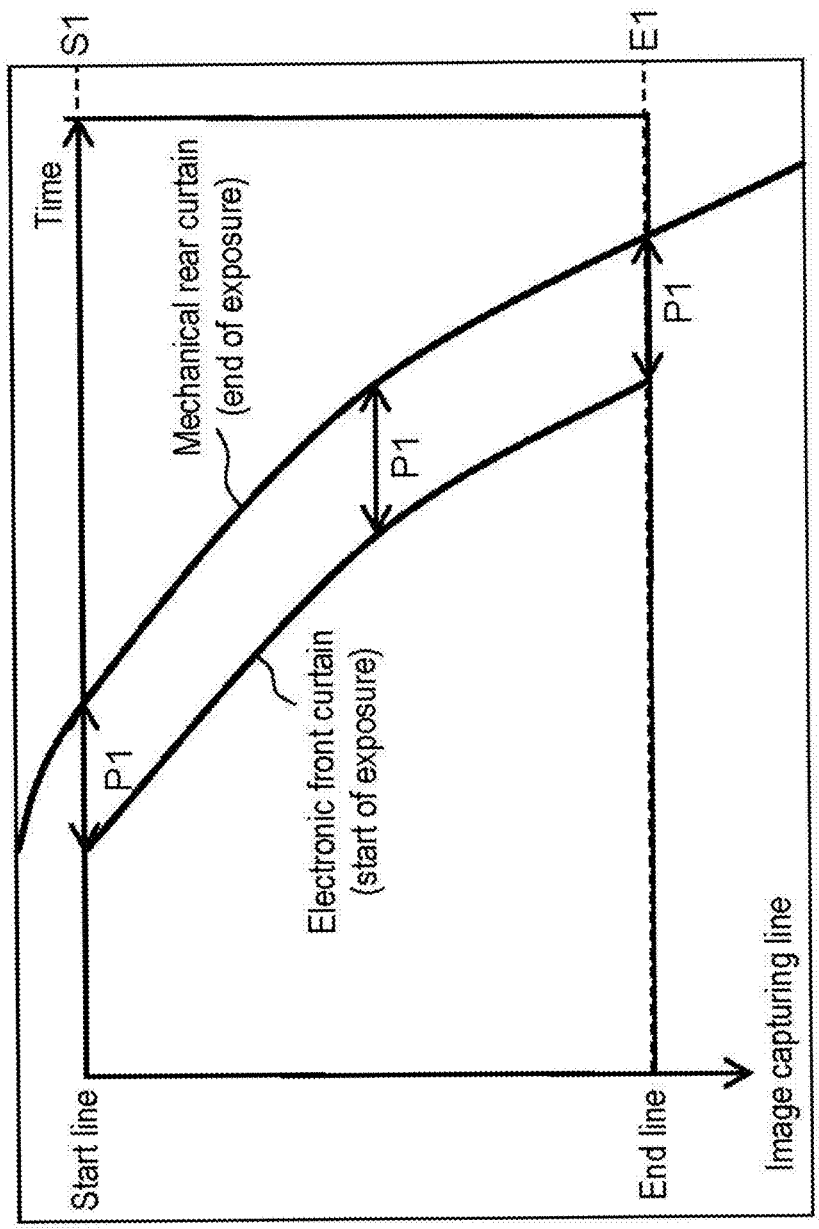
FIG. 10 is a diagram showing an exemplary locus curve of each of an electronic front curtain and a mechanical rear curtain.
Figure 11:
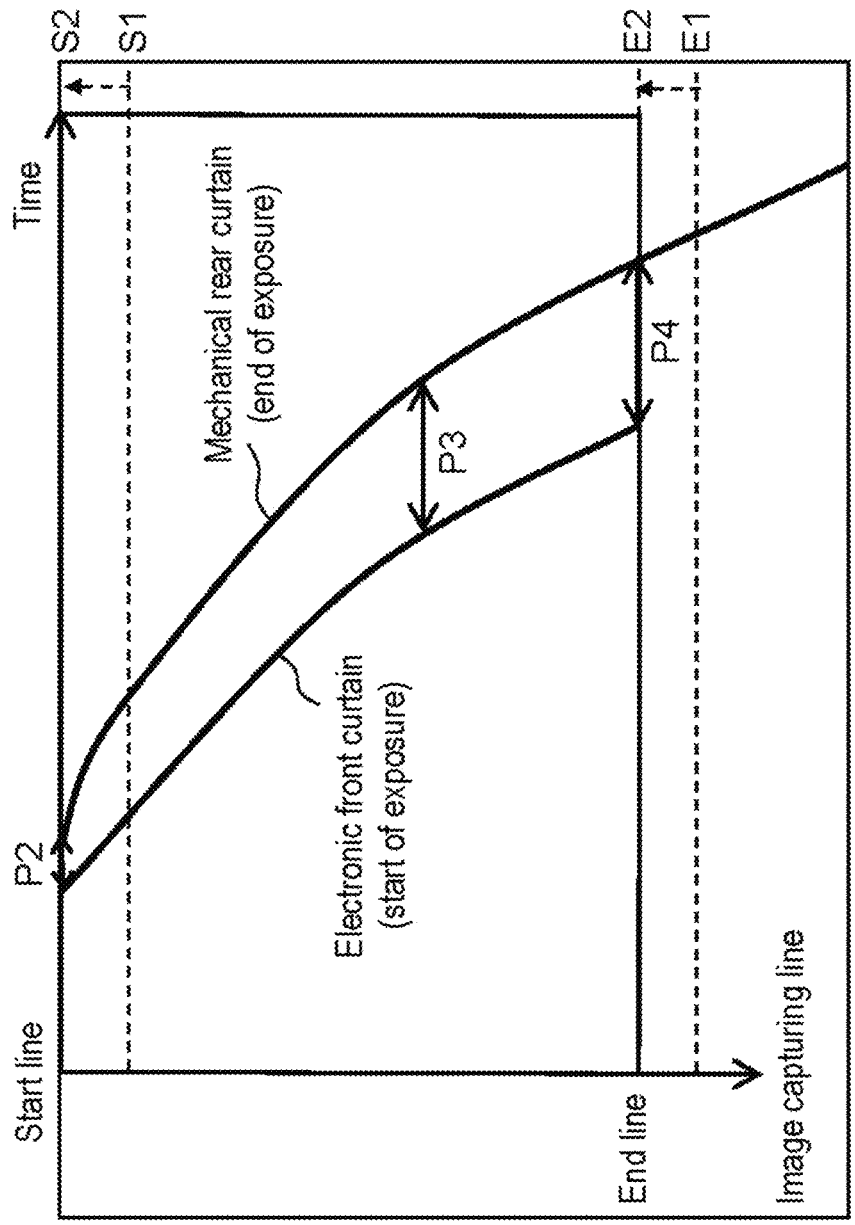
FIG. 11 is a diagram showing another exemplary locus curve of each of an electronic front curtain and a mechanical rear curtain.

FIG. 10 is a diagram showing an exemplary locus curve of each of an electronic front curtain and a mechanical rear curtain. FIG. 11 is a diagram showing another exemplary locus curve of each of an electronic front curtain and a mechanical rear curtain.

The sensor-shift image stabilization has a camera shake prevention mode in which a camera shake is cancelled from a live-view image according to a camera shake detection signal. When this camera shake prevention mode is ON, the position of the imaging device is moving according to the camera shake detection signal. Under the condition that the position of the imaging device is moving, the exposure control is started in response to a user's operation of fully pressing release button 103. The electronic front curtain and the mechanical rear curtain run according to a specified shutter speed to complete the exposure control.

Since the electronic front curtain shutter is configured by an electronic front curtain and a mechanical rear curtain, it is important for the exposure control how precisely it can control the electronic front curtain reset depending on changes in mechanical characteristics of the mechanical rear curtain.

Therefore, the electronic front curtain shutter adjusts the reset timing of the electronic front curtain reset to conform to the locus of the mechanical rear curtain, and adjusts a timing of reset-scan of CMOS image sensor 122 line by line such that the exposure time becomes constant.

FIG. 10 shows an exemplary locus curve of each of the electronic front curtain and the mechanical rear curtain, where the horizontal axis indicates time and the vertical axis indicates a shutter position. The curve of the electronic front curtain is shown as earlier than the curve of the mechanical rear curtain. The distance between the two locus curves indicates the exposure time.

In FIG. 10, the distance between the locus curve of the electronic front curtain (start of exposure) and the locus curve of the mechanical rear curtain (end of exposure) is kept constant as distance P1 from start line 51 to end line E1. This means that the exposure time is constant in the upper and lower parts of CMOS image sensor 122, so that no uneven exposure is caused in the upper and lower parts of CMOS image sensor 122. In the condition that CMOS image sensor 122 is adjusted such that the distance between the locus curve of the electronic front curtain and the locus curve of the mechanical rear curtain is constant as shown in FIG. 10, the start position of the electronic front curtain reset is defined as an initial position of CMOS image sensor 122.

However, when the sensor-shift image stabilization and the electronic front curtain shutter are used concurrently, such a case would occur, before the electronic front curtain reset, that the position of CMOS image sensor 122 has been moved in the Y-direction from the initial position depending on the amount of the camera shake.

FIG. 11 shows an exemplary locus curve of each of the electronic front curtain and the mechanical rear curtain in a case that CMOS image sensor 122 has been moved downward. In FIG. 11, the horizontal axis indicates time and the vertical axis indicates a shutter position. The curve of the electronic front curtain is shown as earlier than the curve of the mechanical rear curtain. The distance between the two locus curves indicates the exposure time.

Referring to FIG. 11, even when CMOS image sensor 122 has been shifted downward, the exposure control is executed on the assumption that CMOS image sensor 122 is in the initial position, so that start line 51 is shifted to start line S2, and end line E1 is shifted to end line E2.

The distance between the locus curve of the electronic front curtain and the locus curve of the mechanical rear curtain increases gradually from start line S2 to end line E2 as distance P2 to distance P3 to distance P4, where P2<P3<P4. Accordingly, since the distance between the locus curves becomes different in the upper and lower parts of CMOS image sensor 122, uneven exposure is caused.

Figure 12:
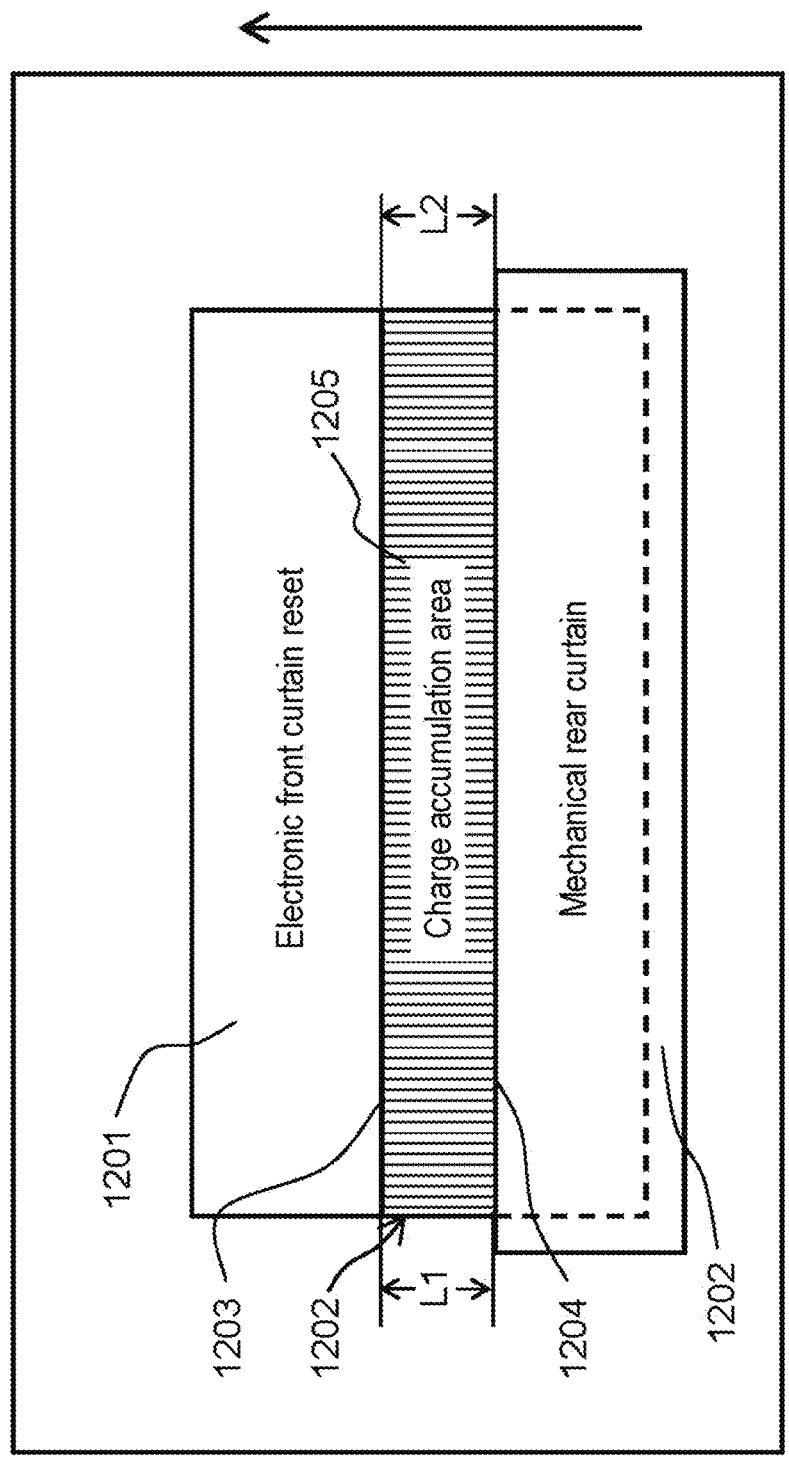
FIG. 12 is a diagram for explaining a shooting operation when a CMOS image sensor is in an initial position.

FIG. 12 is a diagram for explaining a shooting operation when CMOS image sensor 122 is in the initial position. FIG. 12 is a view of CMOS image sensor 122 and mechanical shutter 129 observed in the optical axis direction from the optical system side in a state in which, after a shooting has been started by a user's operation of fully pressing release button 103, electronic front curtain 1201 executed in CMOS image sensor 122 and mechanical rear curtain 1202 of mechanical shutter 129 are on their way of running. An arrow indicates a running direction of electronic front curtain 1201 and mechanical rear curtain 1202.

Also, FIG. 12 shows a state in which each of electronic front curtain 1201 and mechanical rear curtain 1202 is shielding a part of CMOS image sensor 122. Area 1205 between end 1203 of electronic front curtain 1201 and end 1204 of mechanical rear curtain 1202 is not shielded by any of electronic front curtain 1201 and mechanical rear curtain 1202. That is, area 1205 is a charge accumulating area in which charges are being accumulated in CMOS image sensor 122 by exposure. Since CMOS image sensor 122 is in the initial position in FIG. 12, right and left charge accumulating intervals L1 and L2 of area 1205 are the same. Accordingly, no uneven exposure is caused in the right and left areas of CMOS image sensor 122.

Figure 13:
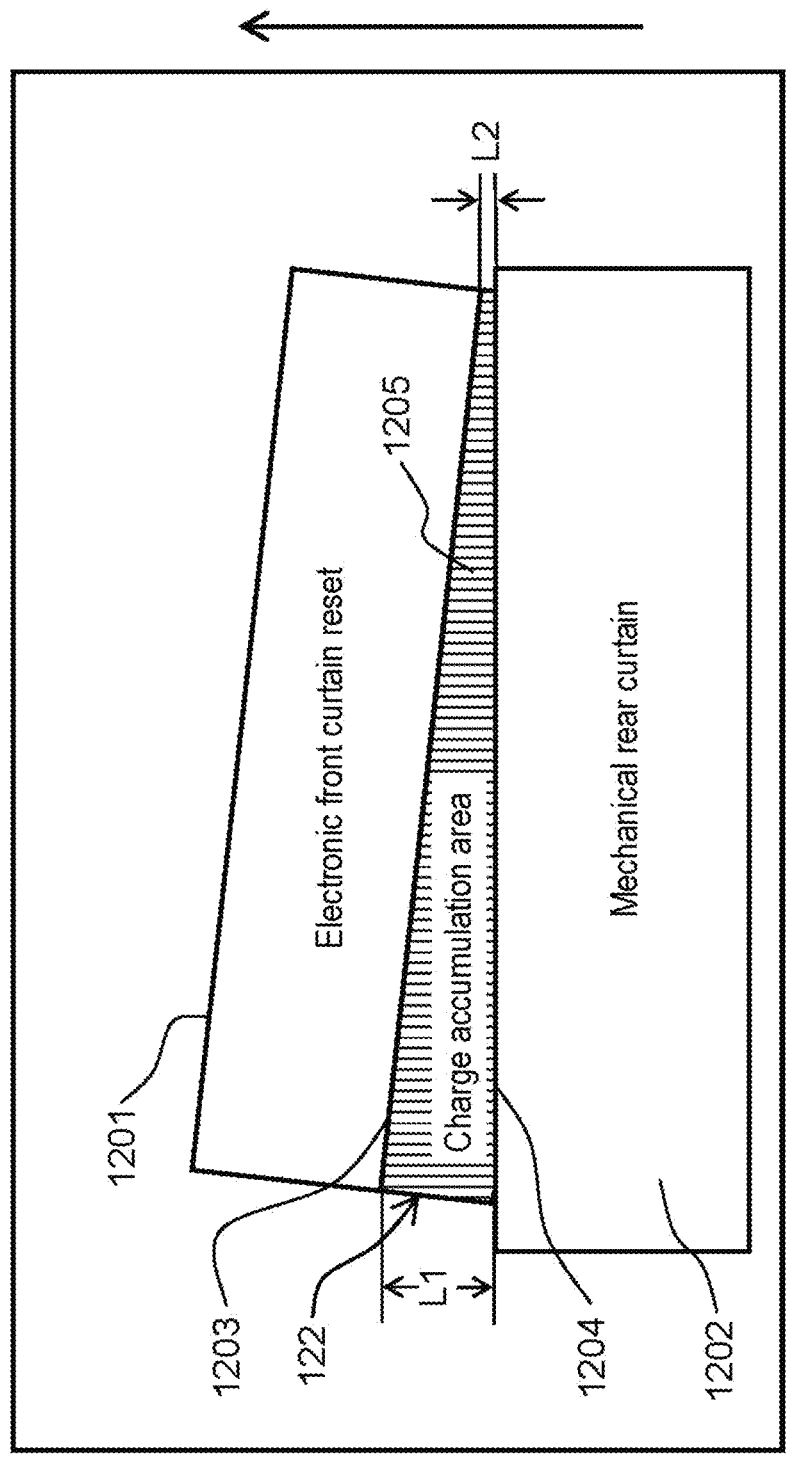
FIG. 13 is a diagram for explaining a shooting operation when the CMOS image sensor is not in the initial position.

FIG. 13 is a diagram for explaining a shooting operation when CMOS image sensor 122 is not in the initial position.

FIG. 13 is a view of CMOS image sensor 122 and mechanical shutter 129 observed in the optical axis direction from the optical system side in a state in which, after a shooting has been started by a user's operation of fully pressing release button 103, electronic front curtain 1201 executed in CMOS image sensor 122 and mechanical rear curtain 1202 of mechanical shutter 129 are on their way of running. An arrow indicates a running direction of electronic front curtain 1201 and mechanical rear curtain 1202.

Also, FIG. 13 shows a state in which each of electronic front curtain 1201 and mechanical rear curtain 1202 is shielding a part of CMOS image sensor 122. Area 1205 between end 1203 of electronic front curtain 1201 and end 1204 of mechanical rear curtain 1202 is not shielded by any of electronic front curtain 1201 and mechanical rear curtain 1202. That is, area 1205 is a charge accumulating area in which charges are being accumulated in CMOS image sensor 122 by exposure.

In the state shown in FIG. 13, a rotational correction by the sensor-shift image stabilization is effected, so that CMOS image sensor 122 has been rotated. The angle of CMOS image sensor 122 has been changed from the initial position depending on the amount of rotational shake. In the state that CMOS image sensor 122 is in a rotated position, if the exposure control is executed in the same way as in the case that CMOS image sensor 122 is in the initial position, right and left charge accumulating intervals L1 and L2 of area 1205 become different from each other. Accordingly, uneven exposure is caused in the right and left areas of CMOS image sensor 122.

2-5. Operation of Electronic Front Curtain Shutter

In the first exemplary embodiment, when the sensor-shift image stabilization and the electronic front curtain shutter are used concurrently, the exposure control is performed after moving CMOS image sensor 122 to the initial position.

Figure 14:
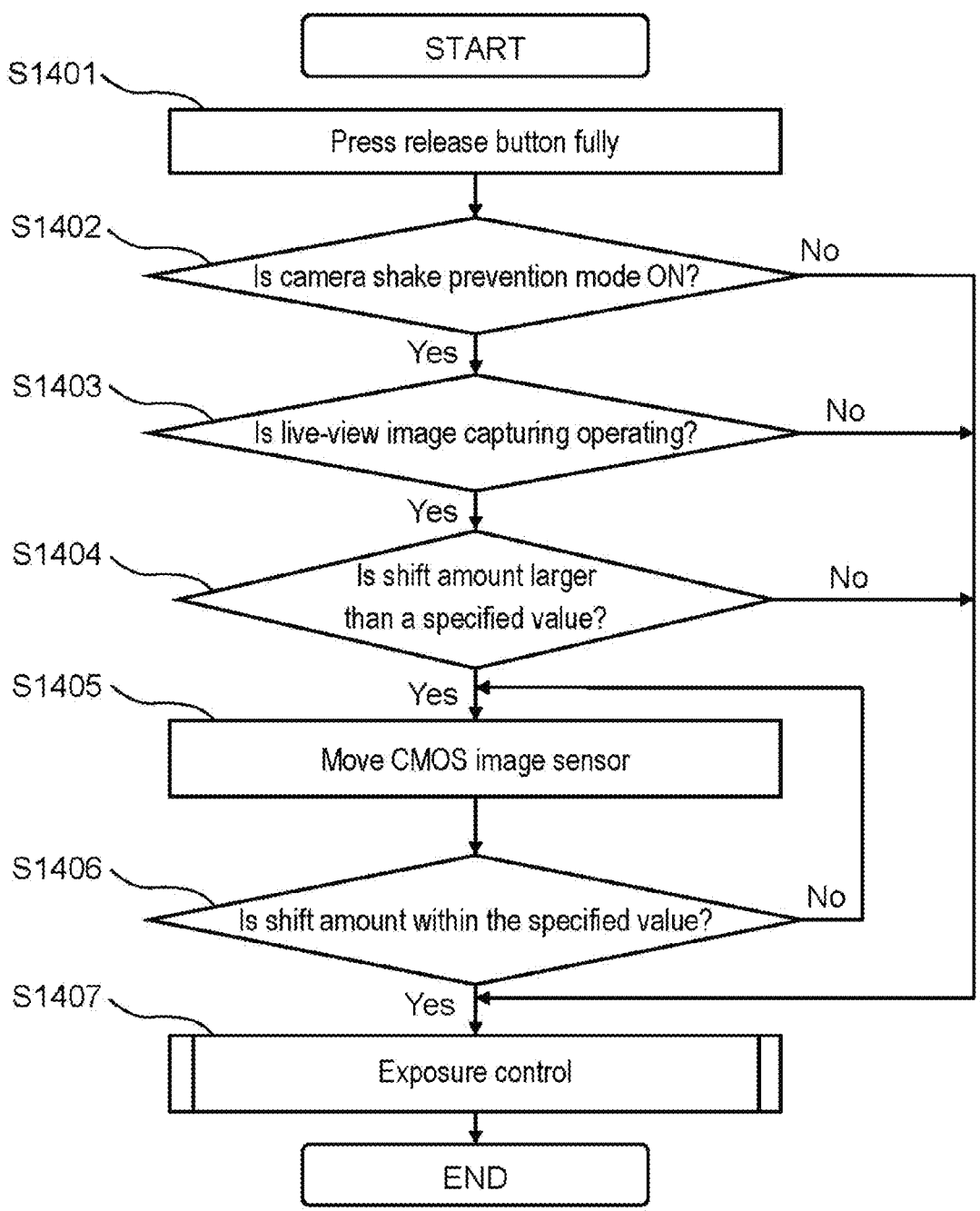
FIG. 14 is a flowchart showing a shooting operation in accordance with the first exemplary embodiment.

FIG. 14 is a flowchart showing a shooting operation in accordance with the first exemplary embodiment. A shooting operation will be described in a case that CMOS image sensor 122 is in a position shifted in the Y-direction from the initial position.

Step S1401: Release button 103 is pressed fully by a user, so that a shooting operation is started.

Step S1402: Camera controller 120 obtains information from image stabilizer 132, and determines whether or not the camera shake prevention mode is ON. If the camera shake prevention mode is ON (if Yes), the process proceeds to step S1403, and if the camera shake prevention mode is not ON (if No), the process proceeds to step S1407.

Step S1403: Camera controller 120 determines whether or not the live-view image capturing is operating. If the live-view image capturing is operating (if Yes), the process proceeds to step S1404, and if the live-view image capturing is not operating (if No), the process proceeds to step S1407.

Step S1404: Image stabilization controller 135 obtains position information of image stabilization in the Y-direction from angular velocity sensor 131. Based on the position information obtained, image stabilization controller 135 determines whether or not the shift amount of CMOS image sensor 122 in the Y-direction is within a specified value from the initial position. The specified value here is set, for example, to 0.6 EV. This value is based on JIS B7091-1992, "Shutters for still cameras", Japanese Industrial Standard, in which unevenness of exposure time, out of tolerances of exposure time representing performances of a shutter mechanism used for photographic cameras, is specified to be 0.6 EV or less in the case that the reference value of exposure time is $\frac{1}{125}$ or less. More specifically, vertical unevenness of exposure in CMOS image sensor 122 may be within the specified value of 0.6 EV.

Figure 15:
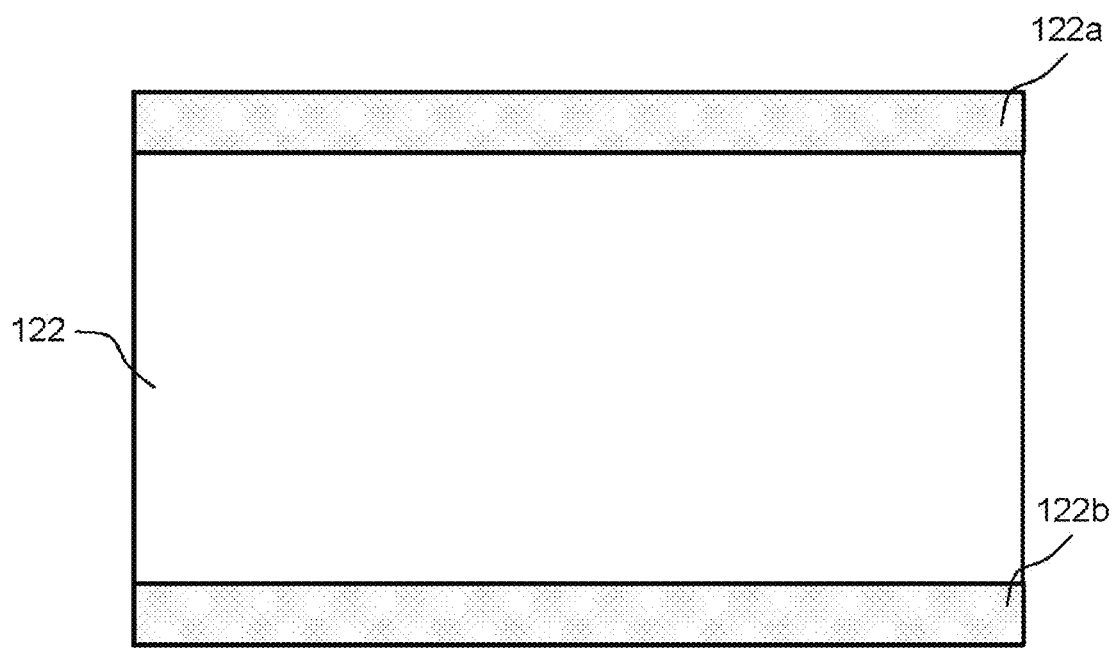
FIG. 15 is a diagram for explaining a measurement of vertical unevenness of exposure in the CMOS image sensor.

FIG. 15 is a diagram for explaining a measurement of vertical unevenness of exposure in CMOS image sensor 122.

The vertical unevenness of exposure is obtained by measuring exposure in first area 122a, which is an upper part of CMOS image sensor 122, and exposure in second area 122b, which is a lower part of CMOS image sensor 122, and taking a difference between them as unevenness of exposure. First area 122a contains several rows of pixels from the top of CMOS image sensor 122, and second area 122b contains several rows of pixels from the bottom of CMOS image sensor 122. Exposure is measured such that exposure of each pixel in first area 122a is measured, and an average value is taken as exposure of first area 122a. Similarly, exposure of each pixel in second area 122b is measured, and an average value is taken as exposure of second area 122b.

The vertical unevenness of exposure in CMOS image sensor 122 may be measured either in a RAW state of CMOS image sensor 122 or in a state after a correction such as gamma correction.

Also, the specified value may be lowered when the shutter speed becomes long.

Image stabilization controller 135 proceeds its control to step S1407 if the shift amount of CMOS image sensor 122 is determined within the specified value (if No), and to step S1405 if the shift amount of CMOS image sensor 122 is determined larger than the specified value (if Yes).

Step S1405: Camera controller 120 controls image stabilizer 132 to perform a reset, to move CMOS image sensor 122 in the Y-direction. In other words, camera controller 120 controls image stabilizer 132 to move CMOS image sensor 122 in the scanning direction of the electronic front curtain of CMOS image sensor 122.

Step S1406: Image stabilization controller 135 determines whether or not the position of CMOS image sensor 122 becomes within the specified value from the initial position. If the position of CMOS image sensor 122 becomes within the specified value (if Yes), a movement of CMOS image sensor 122 is stopped and the process proceeds to step S1407, and if the position of CMOS image sensor 122 is not within the specified value (if No), the process returns to step S1405.

Step S1407: The exposure control as described with reference to FIG. 5 will be performed.

Although the shooting operation has been described with reference to the flowchart in a case that CMOS image sensor is in a position shifted in the Y-direction from the initial position, a similar operation is performed also in a case that CMOS image sensor 122 is shifted in a rotational direction from the initial position.

3. Advantageous Effects

According to the present exemplary embodiment, as described above, an imaging apparatus includes: a camera shake detector configured to detect a camera shake; an imaging device configured to capture a subject image; an image stabilizer configured to move the imaging device in a plane perpendicular to an optical axis; an electronic front curtain configured to reset electric charges accumulated in the imaging device; a mechanical shutter configured to switch between blocking and passing of a subject image to be collected onto the imaging device; and an image stabilization controller configured to produce an image stabilization signal from the camera shake detected by the camera shake detector and configured to control the image stabilizer. The image stabilization controller controls the imaging device to move to a specified position and then controls the electronic front curtain to operate in response to the shooting instruction.

With this configuration, it is possible to prevent uneven exposure from being caused when the sensor-shift image stabilization and the electronic front curtain reset are used concurrently.

Other Exemplary Embodiments

The first exemplary embodiment has been described as above as an example of the present disclosure. However, the present disclosure is not limited to this embodiment, and may be applied to other embodiments which may be appropriately subjected to any changes, substitutions, additions or deletions.

Other exemplary embodiments will be described below.

The first exemplary embodiment has been described in relation to an electronic front curtain shutter. However, in an imaging apparatus having a mechanical front curtain shutter, the mechanical front curtain may be substituted by an electronic front curtain reset.

Also, the first exemplary embodiment has been described in relation to a CMOS image sensor as an imaging device. However, any other imaging device having an electronic front curtain reset may be used.

Also, the sensor-shift image stabilization described in the first exemplary embodiment is movable in a 3-axis range, that is, in X-direction, Y-direction and a rotational direction. However, the image stabilization may be a 2-axis movable image stabilization which is movable in the X-direction and the Y-direction. Also, such a movable axis may be used that is driven by a drive control in only a rotational direction.

Also, the first exemplary embodiment has been described in relation to an angular velocity sensor for camera shake detection. However, an acceleration sensor may be used for camera shake detection. Also, any other sensor such as an image sensor may be used, or a plurality of sensors may be used in combination.

Also, the first exemplary embodiment has been described in relation to a voice coil motor as an actuator for image stabilization. However, any other actuator such as an ultrasonic motor or a stepping motor may be used.

What is claimed is:

1. An imaging apparatus for use in a camera, comprising:
   a camera shake detector configured to detect a shake of the camera;
   an imaging device configured to capture a subject image;
   an image stabilization controller configured to produce an image stabilization signal from the shake of the camera detected by the camera shake detector;
   an image stabilizer configured to move the imaging device, with respect to the camera, in a plane perpendicular to an optical axis from an initial position of the imaging device, with respect to the camera, according to the image stabilization signal;
   an electronic front curtain configured to reset electric charges accumulated in the imaging device; and
   a mechanical shutter configured to switch between blocking and passing of a subject image to be collected onto the imaging device;
   wherein the initial position of the imaging device with respect to the camera is a position at which a distance between a locus curve of the electric front curtain and a locus curve of the mechanical shutter is a predetermined distance,
   wherein, in response to a shooting instruction, the image stabilization controller:
   determines whether the imaging device is more than a specified distance from the initial position; and
   if the image stabilization controller determines that the imaging device is more than the specified distance from the initial position, the image stabilization controller controls the image stabilizer so as to move the imaging device to a specified position, which is a position that is at or closer than the specified distance from the initial position, and then controls the electronic front curtain to operate.

2. The imaging apparatus according to claim 1, wherein movement of the imaging device by the image stabilization controller in response to the shooting instruction is movement along a scanning direction of the electronic front curtain.

3. The imaging apparatus according to claim 1, wherein movement of the imaging device by the image stabilization controller in response to the shooting instruction comprises rotation of the imaging device.

4. The imaging apparatus according to claim 1, wherein the specified distance is zero and the specified position is an initial position of the imaging device.

5. The imaging apparatus according to claim 1, wherein the specified position is a position in which vertical unevenness of exposure of the imaging device is within 0.6 EV from the initial position of the imaging device.

6. The imaging apparatus according to claim 1, wherein the image stabilization controller controls the imaging device to move to the specified position when the imaging device is not within a specified position range, and controls the imaging device not to move when the imaging device is within the specified position range in response to the shooting instruction.

* * * * *